United States Patent [19]

Kellett

[11] Patent Number: 5,038,306
[45] Date of Patent: Aug. 6, 1991

[54] ELECTRONIC CONTROLLER UNIT FOR CORRECTION OF MOTOR VEHICLE SUSPENSION SYSTEM DAMPING RATE SENSING ERRORS

[76] Inventor: Michael A. Kellett, 177 York Road, Stevenage, Hertfordshire, SG1 4AH, United Kingdom

[21] Appl. No.: 469,430
[22] PCT Filed: Oct. 5, 1988
[86] PCT No.: PCT/GB88/00822
§ 371 Date: Apr. 3, 1990
§ 102(e) Date: Apr. 3, 1990
[87] PCT Pub. No.: WO89/03019
PCT Pub. Date: Apr. 6, 1989

[30] Foreign Application Priority Data

Oct. 5, 1987 [GB] United Kingdom ............... 8723339

[51] Int. Cl.⁵ ............................................. B60G 17/00
[52] U.S. Cl. ................... 364/571.01; 364/424.05; 280/707; 188/299; 188/278
[58] Field of Search ............... 364/571.03, 424.05; 280/707; 188/276, 299, 278, 319; 73/1 R; 374/1, 172

[56] References Cited

U.S. PATENT DOCUMENTS

| | | | |
|---|---|---|---|
| 4,192,005 | 3/1980 | Kurtz | 364/571.03 |
| 4,335,901 | 6/1982 | Gladish | 280/711 |
| 4,399,515 | 8/1983 | Gross | 364/571.03 X |
| 4,478,527 | 10/1984 | Mergner | 374/172 |
| 4,490,803 | 12/1984 | Briggs | 364/571.03 |
| 4,522,072 | 6/1985 | Sulouff et al. | 73/765 |
| 4,542,638 | 9/1985 | Tlaker | 73/1 R |
| 4,592,002 | 5/1986 | Bozarth, Jr. et al. | 364/571.03 |
| 4,611,304 | 9/1986 | Butenko et al. | 364/508 X |
| 4,613,115 | 9/1986 | Smith | 280/702 X |
| 4,633,422 | 12/1986 | Brauer | 73/1 R X |
| 4,647,069 | 3/1987 | Iijima | 280/707 |
| 4,734,873 | 3/1988 | Malloy et al. | 73/1 R X |
| 4,847,794 | 7/1989 | Hrubes | 374/172 |
| 4,910,519 | 3/1990 | Duell et al. | 364/571.02 X |
| 4,913,457 | 4/1990 | Häfner et al. | 280/707 |
| 4,967,385 | 10/1990 | Brekkestran et al. | 364/571.03 |

*Primary Examiner*—Joseph L. Dixon
*Attorney, Agent, or Firm*—Locke Reynolds

[57] ABSTRACT

An electronic controller unit particularly intended for use with intelligent suspension systems for motor vehicles incorporates a microprocessor for enabling operational calibration of each of a plurality of transducers associated therewith in such a manner as to take into account zero output level influencing factors to establish a compound calibration relationship for each transducer. A non-volatile memory stores each such calibration relationship and the microprocessor compares the instantaneous output of each transducer with its stored associated calibration relationship value for the ambient temperature prevailing at the time of the instantaneous output to produce a temperature corrected output value for each transducer.

3 Claims, 1 Drawing Sheet

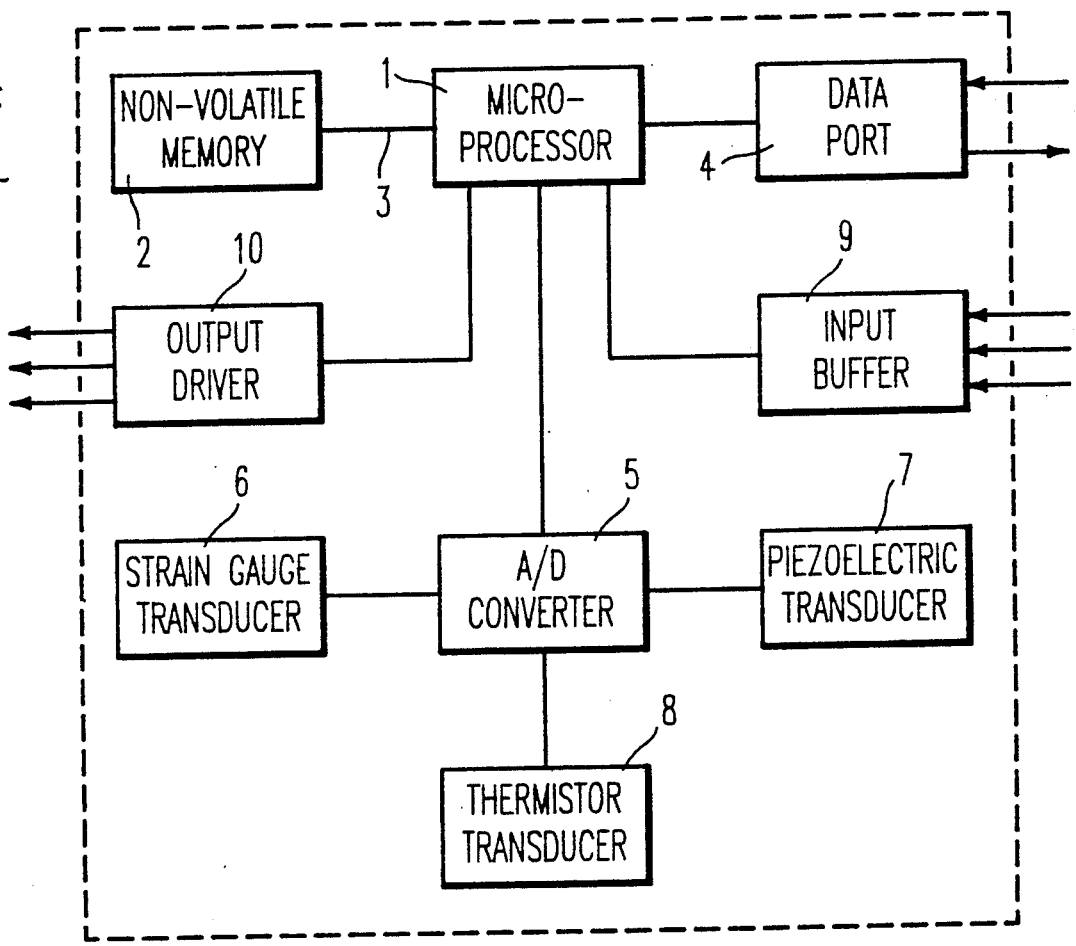

ELECTRONIC CONTROLLER UNIT FOR CORRECTION OF MOTOR VEHICLE SUSPENSION SYSTEM DAMPING RATE SENSING ERRORS

This invention relates to electronic controller units.

In particular, the present invention is concerned with controller units for use with transducers associated with intelligent suspension systems for road vehicles.

Suspension systems for motor vehicles are intended to enhance, inter alia, passenger comfort, road holding of the vehicle, and to reduce stress and stains induced into the mechanical components of the vehicle during motion of the vehicle. Present day vehicles generally speaking employ a compliant suspension system in which the vertical motion of the vehicle body is, to a greater or lesser extent, isolated from the vertical motion of the wheels of the vehicle. While, in practice, the conventionally provided springs will achieve the required isolation they are almost universally used in conjunction with some kind of energy absorbing device(s) to control vibrations of the resonant frequency of the body mass acting upon the spring compliance. In most suspension systems presently used the spring rates and energy absorption parameters are determined during the manufacture of the vehicle and are not normally subsequently capable of being varied to accommodate different or varying road conditions.

With a view to overcoming this inability to vary the energy adsorption parameter constraints so called active suspension systems have been proposed in which energy is injectable into the wheel/body system of the vehicle, by way of fast acting hydraulic rams connecting the wheel suspensions to the vehicle body and which are also able to absorb energy entering the system from the vertical motions produced by the linear progression of the vehicle along a surface with vertical humps or the like.

It has been suggested that improvements in passenger comfort etc., may be obtained by introducing arrangements for allowing the damping of the vehicle to be varied in response to road conditions, and that such variations should be effected automatically by the provision of devices for sensing the damping rate and for adjusting the damping accordingly.

The arrangements provided to control the damping rate and other factors considered to be involved or associated with the enhancing of passenger comfort, road holding, and reducing mechanical stress and strain etc., are commonly referred to as intelligent suspension systems.

Such intelligent suspension systems comprise, in general, devices such as transducers which measure certain physical parameters associated with the suspension system, and actuators to modify the suspension system behavior. In addition, an intelligent suspension system requires some form of controller circuit which is responsive to the parameters measured and which is arranged to produce a control signal or signals for use in the operation of the devices i.e., actuators of the suspension system.

The present invention is particularly concerned with a controller utilizable with the transducers likely to be involved in intelligent suspension systems.

The particular transducers with which the controller/transducer combination of the invention is intended to be used are accelerometers or other transducers which are required to form part of intelligent control arrangements for vehicle suspension systems. For such systems the accelerometers will operate at frequencies in the range extending from D.C to 500 Hz. Within this range it is desirable that the lower limit should be selectively variable at least within the range 0 to 20 Hz. In the case of the upper range limit such selective adjustment should be at least possible between 10 Hz and 500 Hz. In so far as the question of ambient temperature conditions is concerned the accelerometers need to be capable of operating over a wide temperature range of for example −40 to +85 degrees Celsius.

The output signals of transducers are subject to two major 'error' factors, a first of which can be termed the zero offset and is represented by the level of the output in the absence of input, and the second of which can be regarded as the input to output gain relationship of the transducer.

Even though some transducer constructions may be less susceptible to variation of output level with temperature they may be more susceptible to variation of offset errors with temperature.

In the matter of temperature variation the instantaneous output of an accelerometer can be significantly influenced by changes in ambient and/or operational temperatures so that the electrical output relationships of an accelerometer to the acceleration forces being monitored or measured by the accelerometer can vary to an extent that is unacceptable in use.

Thus in relation to this temperature variation of the transducer output it has been found that the output of an accelerometer can vary considerably from that associated with the initial utilization of apparatus or the like with which the accelerometer is associated for measurement purposes and the output from that produced when said apparatus or the like has reached its operational temperatures and/or the ambient temperature conditions relative to the accelerometer have changed from those initally prevailing.

In addition, the output of an accelerometer can vary according to the particular measurement situation to which the transducer is applied; and also to the way in which transducer is installed in a position of use. For example, the orientation of the transducer with respect to the direction of the accelerating forces can affect the output signal levels of a transducer.

The base or zero value for the relationship between electrical output and acceleration forces for an accelerometer will be varied by the ambient temperature conditions, the particular mode of application, and the mode of installation. A consequence of each of these factors is that for each one of them the zero output value of the transducer can be offset whereby the accelerometer output is non-zero for zero acceleration input.

It is an object of the invention to provide an electronic controller unit incorporating electronic circuitry for use with transducers, and more particularly for use with accelerometers, in which inherent or induced errors, for example, zero or output gain errors arising from the effects of temperature, mode of installation and/or application, are eliminated or are at least reduced.

In particular, it is an object of the present invention to provide an electronic controller involving a control circuit/transducer combination which is able to take into account the variability of said offset of the zero output value and the transducer output variations arising from temperature and/or other fluctuations.

According to a first aspect of the invention there is provided an electronic controller unit including a microprocessor for correcting, for variations in the output arising from variations of ambient temperature, the outputs of at least one transducer arranged to be responsive to outside stimulus to be processed by the controller unit, characterised in that the microprocessor has a calibration mode of operation in which the output of the or each transducer associated with the controller unit is calibrated for known ambient temperature values to produce for each such temperature value a correction factor which is stored for subsequent use, and an control mode in which the correction factors are applied to the working outputs of the or each transducer as transducer output correction factors, Preferably, in addition to said temperature calibration the or each transducer is calibrated/corrected for base or zero offset errors, and in that said base or offset errors can include for the or each said transducer the mode of installation of the associated transducer into its operational position, the orientation of the transducer in its operational environment, and/or the mode of application of the transducer in its operational environment.

In a specific application of the controller of the invention at least one of said transducers is arranged to be responsive to variation of predetermined factors associated with a motor vehicle suspension assembly or arrangement.

For a better understanding of the invention and to show how to carry the same into effect reference will now be made to the accompanying drawing which schematically illustrates in block diagrammatic form an electronic controller unit incorporating the principles of the invention.

Referring now to the drawing the electronic controller unit shown therein is intended to provide facilities for correcting/modifying the outputs of transducers to take into account base or zero value offsets in order to establish output/temperature relationships of each of the transducers incorporated in and/or otherwise associated with the controller unit, and also to provide facilities for correcting the instantaneous output(s) of the transducer(s) of and/or associated with the controller unit accordingly so that the controller unit produces an output signal which is suitably corrected.

In practice, with some forms of transducer i.e., accelerometer, the particular orientation of a transducer with respect to the direction of the acceleration producing forces will affect its output. Generally speaking, if the acceleration axis of an accelerometer lies at an angle to the line of accelerating forces the accelerometer will be responsive to a component of the force rather than the total force so that the output of the accelerometer will relate to the component of the force rather than the total acceleration force. For this reason it is desirable to calibrate the accelerometer to take this factor into account in any form of compensation of the accelerometer output.

The electronic controller of the present invention may thus be conveniently regarded as having two major functions, a first which is a control function in which the controller unit controls operation of the arrangements/systems with which the transducers are associated. A second major function is a calibration/correction function which enables the calibration of the transducer(s) incorporated in and/or associated therewith to take into account the installation factor, output gain, mode of use factor and also the temperature variation factor by relating known transducer measurement parameter values to particular temperature values and also a compensating circuit function in which the instantaneous output of the transducer(s) is/are compared with the calibration results whereby a temperature corrected outut value is provided for each transducer.

To achieve these functions the controller unit incorporates a microprocessor 1 which in a first mode is used for establishing a reference or calibration relationship for each transducer incorporated in the unit or effectively integrally associated with the controller unit, between the outputs thereof and input data characteristic of known levels of the parameter with which a transducer under calibration is associated; and which in a second mode is used for real time transducer temperature correction of transducer output. The calibration relationships established by the microprocessor are stored in a non-volatile store 2, connected with the microprocessor by way of a data and control signal bus 3.

The unit includes a control signal and input data port 4 connecting with the microprocessor 1. This port is intended to provide access to the microprocessor for control signals to select the operating mode, and to control the calibration process by providing information describing the mechanical stimulus (input) being applied. By this means the processing is able to establish the relationship between the transducer output and the mechanical input.

On the assumption that the various transducers involved with the electronic controller unit produce output in analogue form the various transducers are connected with the microprocessor 1 by way of a multi-input analogue to digital converter 5.

In the control unit of the FIGURE three transducers 6, 7, and 8 are shown to be connected to the converter 5. As shown the transducer 6 is a strain gauge accelerometer and the transducer 7 is a piezo-electrical accelerometer. The accelerometers are mechanically attached to whatever member, article, etc., the acceleration of which it is desired to measure and/or monitor. The transducer 8 is formed by a thermistor whose purpose is to sense the temperature of the transducers 6 and 7.

It is convenient to note that if any transducer is such as to produce output in digital or pulsed form the transducer output would be applied directly to the microprocessor 1.

In addition, as shown the microprocessor 1 has associated input buffer circuits 9 and output driver circuits 10

It will be appreciated that in the FIGURE the connections between the various components of the electronic controller unit are only very schematically shown and that, in practice, there would be a much greater complexity of inter-connections between the various components of the electronic controller unit shown in the FIGURE.

In practice, the various transducers 6, 7 and 8 are regarded as being an integral part of the electronic controller unit so that the latter can be regarded as an integral package of electronic control circuitry and transducer(s).

Following the manufacture of the electronic controller unit, the unit is tested for correctness of manufacture and operation. The unit is then calibrated in order establish calibration data in respect of transducer installation orientation etc., and also to establish the above mentioned temperature/transducer measurement parameter relationships or calibration map for the associated transducers.

To calibrate the electronic controller unit the latter is mounted into apparatus which is capable of subjecting the unit transducers to changes in the particular parameter involved. In the present instance the apparatus is able to subject the control unit to known acceleration levels whilst at the same time subjecting the control unit to temperature changes though a range of values extending throughout the required temperature range of operation of the controller unit.

During the actual calibration operation the microprocessor 1 is set to its calibration mode by application of the requisite control signals to the input data port 4.

The controller unit is then subjected to the above mentioned known acceleration force levels so that the transducers 6 and 7 are subjected to known accelerations. The transducers produce output signals which are uncorrected for temperature conditions. These uncorrected outputs are applied to the converter 5 and thus subsequently applied to the microprocessor as digital signals. The thermistor 8 will produce its output and this output will be characteristic of the temperature conditions in the immediate vicinity of the thermistor. In practice, it is arranged that the thermistor is as close as possible to the transducers 6 and 7 so as to avoid introduction of error due to the fact that the transducers 6 and 7 could be at a temperature different from that prevailing at the thermistor. If desired, each transducer 6 or 7 could have a thermistor uniquely associated therewith.

At the same time as the application of the digital signals derived from the transducers, data signals are applied to the microprocessor by way of the port 4, the data signals describing the applied acceleration levels.

The microprocessor 1 thus receives three main forms of signals; firstly, signals related to i.e., a function of known acceleration force levels; secondly, signals related to the actual output of the transducers 6 and 7; and thirdly signals related to the thermistor output. The microprocessor is either firmwired or suitably programmed to be able to produce from these signals the calibration relationship relating thermistor reading and the real acceleration level to the instantaneous outputs of the transducers 6 and 7.

For each such known acceleration level set into the apparatus the temperature is changed throughout said expected range whereby the microprocessor 1 receives a series of input values from the transducers 6 and 7, the thermistor, and the real acceleration level data and derives therefrom the calibration map.

The temperature variation calibration thus derived is stored in the non-volatile memory 2.

To take into account the effects of the installation orientation the transducer controller unit is subjected to a second calibration, which can be regarded as an In Situ calibration, and which involves effecting measurements with the transducer installed at differing angles to the accelerating force direction.

Further calibration operations can be carried out according to what ever factor is thought likely to affect the zeroing of the transducer input/output relationship.

At the end of the calibration stage the electronic controller unit will incorporate a full calibration history with which the instantaneous output from a transducer 6 or 7 is compared so as to produce, during the active use of the transducers 6 and 7 outputs, corrected for all of the factors thought relevant.

Whilst in use the electronic controller unit will be continuously monitoring the thermistor reading and using such reading and any other information considered relevant to ensure that the requisite correction factor is applied to the outputs of the associated accelerometers whereby the outputs from the electronic control unit are always corrected for whatever factors considered relevant.

the controller unit of the invention can conveniently be regarded as a composite assembly or package which includes not only transducers but also a microprocessor for enabling establishing calibration relationships for the transducers which relationships are internally permanently stored in non-volitile memory i.e., in Read Only Memory devices and for enabling such stored relationships to be used for real time comparisons with instantaneous transducer outputs whereby the actual outputs produced by the controller are suitably compensated for ambient temperature values.

In other words, in use, the electronic controller unit of the invention provides an arrangement whereby the outputs from the transducers associated with the unit are corrected for temperature and/or any other factors considered relevant.

In use the accelerometers of the controller unit will be mounted to those parts of a motor vehicle suspension system whose movements are to be monitored and controlled.

I claim:

1. Apparatus for optimizing the ride characteristics of a motor vehicle which includes a compliant suspension system having damping means for damping vertical motion of the motor vehicle, accelerometer means for sensing the rate of acceleration of the vehicle and adjusting means responsive to the accelerometer means for adjusting the damping means, the improvement comprising:
   an electronic controller unit including:
      transducer means responsive to temperature in the immediate vicinity of the accelerometer means, the transducer means including an output,
      a non-volatile memory for storing data relating the output of the transducer means to a correction factor to be applied to the acceleration rate as sensed by the accelerometer means,
      a microprocessor coupled to the transducer means, the non-volatile memory and the output of the accelerometer means for retrieving stored correction factors from the non-volatile memory based on the output of the transducer means and applying the correction factors to the acceleration rate sensed by the accelerometer means thereby generating a corrected acceleration rate, and
      an output driver coupled to the adjusting means and to the microprocessor for applying the corrected acceleration rate to the adjusting means so as to correct for the effect of the temperature in the immediate vicinity of the accelerometer means.

2. The improvement of claim 1 further comprising an input buffer means coupled between the microprocessor and the output of the accelerometer means.

3. The improvement of claim 1 further comprising a data port coupled to the microprocessor for entering data into the non-volatile memory relating the output of the transducer means to the correction factor to be applied to the acceleration rate as sensed by the accelerometer means.

* * * * *